United States Patent [19]
Suzuki et al.

[11] Patent Number: 6,094,987
[45] Date of Patent: Aug. 1, 2000

[54] METHOD AND APPARATUS FOR ULTRASONIC WAVE MEASUREMENT

[75] Inventors: Hideyuki Suzuki; Hisanaga Tanaka; Hajime Hachisuka, all of Shizuoka, Japan

[73] Assignee: Fuji Ultrasonic Engineering Co. Ltd., Shizuoka, Japan

[21] Appl. No.: 09/325,578

[22] Filed: Jun. 3, 1999

[51] Int. Cl.[7] .................................................. G01H 5/00
[52] U.S. Cl. .................................................. 73/597; 73/645
[58] Field of Search .............................. 73/645, 646, 597, 73/61.79, 570

[56] References Cited

U.S. PATENT DOCUMENTS

| | | | |
|---|---|---|---|
| 2,871,460 | 1/1959 | Beebe | 73/645 |
| 4,421,119 | 12/1983 | Pratt, Jr. | 73/597 |
| 4,630,482 | 12/1986 | Traina | 73/597 |
| 4,762,001 | 8/1988 | Wuttke | 73/597 |
| 4,933,911 | 6/1990 | Sondergeld et al. | 367/13 |
| 5,035,147 | 7/1991 | Woodward | 73/861.28 |
| 5,052,227 | 10/1991 | Le Floc'h et al. | 73/644 |
| 5,557,047 | 9/1996 | Koide | 73/597 |
| 5,936,160 | 8/1999 | Salo | 73/597 |

FOREIGN PATENT DOCUMENTS

| | | | |
|---|---|---|---|
| 58-77656 | 5/1983 | Japan | G01N 29/02 |

*Primary Examiner*—Richard A. Moller
*Attorney, Agent, or Firm*—Orum & Roth

[57] ABSTRACT

First and second ultrasonic sensors 1A and 2A are arranged facing each other, and these ultrasonic sensors 1A and 2A are provided with first and second reflectors 1 and 2 on their surface, respectively, and thereby, a propagation time $t_t$ of ultrasonic wave in a distance L within a medium subject to measurement is determined from the following equation $t_t=(t_4-t_3+t_2-t_1)/2$.

2 Claims, 4 Drawing Sheets

METHOD AND APPARATUS FOR ULTRASONIC WAVE MEASUREMENT

BACKGROUND OF THE INVENTION

1. Field of the Invention

The present invention relates to a method and an apparatus for ultrasonic wave measurement, and more particularly, to a method and an apparatus for ultrasonic wave measurement suitable for measuring a velocity of sound propagated through a medium subject to measurement such as a gas, a liquid, a solid or the like. Further, the present invention relates to the method and apparatus for ultrasonic wave measurement suitable for determining a component, a concentration and a modulus of elasticity or the like in the case where the medium subject to measurement is a gas or a liquid, and for determining a modulus of elasticity, strength, fatigue, stress, history, life or the like in the case where the medium subject to measurement is a solid.

2. Description of the Related Art

According to a method of measuring the velocity of sound by an ultrasonic wave, an ultrasonic wave transmitter section transmits an ultrasonic wave into a medium subject to measurement, and then, an ultrasonic wave receiver section receives a reflection signal generated on the basis of the transmitted wave, and thus, an absolute velocity (V) of sound propagated through the medium subject to measurement is determined on the basis of a propagation time ($t_t$) and a propagation distance (L) determined by the transmitted wave.

Conventional methods of measuring the velocity of sound include a sing around method, an overlap method and the like.

The sing around method has been used resulting from demands for its stability of measurement, automatic measurement or the like. In this sing-around method, in order to measure a propagation time (Ts) (see FIG. 4), the following equation (1) is required.

$$T_s = 2t_e + 2t_a + 2t_t \tag{1}$$

Where, $t_e$: electrical delay time $t_a$: transmission plate propagation time

Therefore, this method includes times $T_e$ and $T_a$ other than the truly necessary propagation time ($t_t$). The transmission plate propagation time ($t_a$) is sensitive to the influence of external factors such as temperature, pressure or the like. On the other hand, the electrical delay time ($t_e$) has a different inference for each electric circuit system and each component; for this reason, it is difficult to obtain high accuracy and inter-changeability.

According to the overlap method, by measuring multiple wave propagation times $t_{o1}$ and $t_{o2}$ (see FIG. 5) of a multiple reflection signal successively generated on the basis of a transmission wave transmitted from the ultrasonic wave transmitter section in a medium subject to measurement held between a transmission plate and a reception plate facing each other, a propagation time ($t_t$) is obtained by the following equation (2).

$$t_t = (t_{o2} - t_{o1}) \div 2 \tag{2}$$

However, in fact, it is difficult to arrange and manufacture a reflector and the transmission plate in a fully parallel state, and its parallelism varies depending upon pressure or an external force. As a result, measurement error is caused by an imperfection in the parallelism and an angle of these plates.

Moreover, in the case where a reflectivity of the reflector is small, according to the method using the multiple wave, a signal energy of the received signal is small. For this reason, measurement is unstable. As a result, there may be a case where no measurement is made.

SUMMARY OF THE INVENTION

An object of the present invention is to stably measure a propagation time of an ultrasonic wave with high accuracy according to a method which is resistant to the influence of external factors.

To solve the above problem, the present invention provides a method for ultrasonic wave measurement, in which first and second ultrasonic sensors are arranged to face each other, and these first and second ultrasonic sensors are respectively provided with first and second reflectors on their surface, and further, an interval between these reflectors is set as a distance L, comprising the steps of:

measuring a time $t_1$ until an ultrasonic wave transmitted from the first ultrasonic sensor is received in the second ultrasonic sensor, a time $t_2$ until the ultrasonic wave transmitted from the first ultrasonic sensor is reflected by the second reflector, and is received by the first ultrasonic sensor, a time $t_3$ until the ultrasonic wave transmitted from the second ultrasonic sensor is received in the first ultrasonic sensor, and a time $t_4$ until the ultrasonic wave transmitted from the second ultrasonic sensor is reflected by the first reflector, and is received in the second ultrasonic sensor, within a medium subject to measurement; and determining a propagation time $t_t$ of an ultrasonic wave in the distance L within the medium subject to measurement from the following equation $t_t = (t_4 - t_3 + t_2 - t_1)/2$ and an absolute sound velocity V of the medium subject to measurement from the following equation $V = L/t_t$.

Moreover, to solve the above problem, the present invention provides an apparatus for ultrasonic wave measurement, which is constructed in a manner that first and second ultrasonic sensors are arranged facing each other, and these first and second ultrasonic sensors are respectively provided with first and second reflectors on their surface, and further, an interval between these reflectors is set as a distance L, comprising:

a time measurement circuit for measuring a time $t_1$ until an ultrasonic wave transmitted from the first ultrasonic sensor is received in the second ultrasonic sensor, a time $t_2$ until the ultrasonic wave transmitted from the first ultrasonic sensor is reflected by the second reflector, and is received by the first ultrasonic sensor, a time $t_3$ until the ultrasonic wave transmitted from the second ultrasonic sensor is received in the first ultrasonic sensor, and a time $t_4$ until the ultrasonic wave transmitted from the second ultrasonic sensor is reflected by the first reflector, and is received in the second ultrasonic sensor, within a medium subject to measurement; and an operating circuit for determining a propagation time $t_t$ of an ultrasonic wave in the distance L within the medium subject to measurement from the following equation $t_t = (t_4 - t_3 + t_2 - t_1)/2$ and an absolute sound velocity V of the medium subject to measurement from the following equation $V = L/t_t$.

In the present invention, as shown in FIG. 1, a sensor 1A (first ultrasonic sensor) and a sensor 2A (second ultrasonic sensor) are arranged facing each other, and these sensors 1A and 2A are provided with a reflector 1 (first reflector) and a reflector 2 (second reflector) on their surface, respectively. A distance between these reflectors 1 and 2 facing each other is set as L, and a medium subject to measurement held between these reflectors 1 and 2 is a gas, a liquid or a solid. According to the invention, the following time intervals are measured: a time ($t_1$) until an ultrasonic wave transmitted from the sensor 1A is received by the sensor 2A; a time ($t_2$) until the ultrasonic wave transmitted from the sensor 1A is reflected by the reflector 2, and is received by the sensor 1A; a time ($t_3$) until the ultrasonic wave transmitted from the sensor 2A is received by the sensor 1A; and a time ($t_4$) until the ultrasonic wave transmitted from the sensor 2A is reflected by the reflector 1, and is received by the sensor 2A. On the basis of this data, the following equation (3) is calculated, and thereby, a propagation time ($t_r$) of the medium subject to measurement is determined.

$$(t_4 - t_3 + t_2 - t_1) \div 2 = \tag{3}$$

$$\{2 \cdot (t_{e2} + t_{a2} + t_t) - (t_{e2} + t_{a2} + t_t + t_{a1} + t_{e1}) + 2 \cdot (t_{e1} + t_{a1} + t_t) -$$

$$(t_{e1} + t_{a1} + t_t + t_{a2} + t_{e2})\} \div 2 = t_t$$

Where, $t_{e1}$ and $t_{e2}$ are an electrical delay time, and $t_{a1}$ and $t_{a2}$ are a reflector propagation time in which an ultrasonic wave transmits through an interior of a reflector made of resin (plastic) or the like.

In the present invention, assuming that a propagation distance which is an interval between the reflectors 1 and 2 is set as L, an absolute velocity (V) of sound propagated through the medium subject to measurement is determined by the following equation (4).

$$V = L \div t_t \tag{4}$$

(Merit 1)

According to the present invention, the sensors 1A and 2A are arranged facing each other. Therefore, even if there is an angular gap in the parallelism between reflectors 1 and 2, it is possible to measure with high accuracy a sound velocity in the following manner as compared with the conventional method.

More specifically, according to the conventional overlap method, in the case where there is an angular gap ($\theta$) (see FIG. 2) in the parallelism between the transmission plate and the reflector (reception plate) shown in FIG. 5, a sensor measures a propagation time of a distance of the following equation (5).

$$(P_1 + P_2 + P_3 + P_4) - (P_1 + P_2) = P_3 + P_4 = \left(\frac{1}{\cos 2\theta} + \frac{1}{\cos 4\theta}\right) \times \tag{5}$$

$$\{(1 + (\cos 2\theta + \sin 2\theta \cdot \tan 3\theta)\sin 2\theta \cdot \tan \theta\} \times (1 + \tan \theta \cdot \tan 2\theta) L_1$$

Then, a measurement error ($\epsilon$ u) is obtained from the following equation (6).

$$\epsilon u = \left|\frac{L_1 - \frac{1}{2}(P_3 + P_4)}{L_1}\right| \tag{6}$$

-continued $$= \left|1 - \frac{1}{2}\left(\frac{1}{\cos 2\theta} + \frac{1}{\cos 4\theta}\right)\right| \times$$

$$\{(1 + (\cos 2\theta + \sin 2\theta \cdot \tan 3\theta)\sin 2\theta \cdot \tan 2\theta\} \times$$

$$(1 + \tan \theta \cdot \tan 2\theta)|$$

If a relation of sin $\theta \div \theta$ is substituted, the measurement error $\epsilon$ u is as shown in the following equation (7).

$$\epsilon u \approx |1 - (1 + 5\theta^2)\{1 + (1 + 4\theta^2)2 \ \theta^2\}(1 + 2\theta^2)| \approx 9\theta^2 \tag{7}$$

On the contrary, according to the method of the present invention, in the case where there is an angular gap ($\theta$) (see FIG. 2) in the parallelism between the reflectors 1 and 2, sensors 1A and 2A measure a propagation time of a distance according to the following equation (8).

$$(P_1 + P_2) - P_1 + (Q_1 + Q_2) - Q_1 = P_2 + Q_2 \tag{8}$$

$$= \left\{\frac{1}{\cos 2\theta} + (\cos \theta + \sin \theta \cdot \tan 2\theta)(1 + \tan^2 \theta)\right\} \cdot L_1$$

Then, a measurement error ($\epsilon$ n) is obtained from the following equation (9).

$$\epsilon n = \left|\frac{L_1 - \frac{1}{2}(P_2 + Q_2)}{L_1}\right| \tag{9}$$

$$= \left|2 - \left(\frac{1}{\cos 2\theta} + (\cos \theta + \sin \theta \cdot \tan 2\theta)(1 + \tan^2 \theta)\right)\right| \cdot \frac{1}{2}$$

$$\approx \left|2 - \left(1 + 2\theta^2 + \left(1 + \frac{3}{2}\theta^2\right)(1 + \theta^2)\right)\right| \cdot \frac{1}{2}$$

$$\approx \frac{9}{4}\theta^2$$

When making a comparison between $\epsilon$ n and $\epsilon$ u, the measurement error is as shown in the following equation (10).

$$\epsilon n / \epsilon u = \frac{9}{4}\theta^2 / 9\theta^2 = \frac{1}{4} \tag{10}$$

Therefore, according to the present invention, the measurement error becomes ¼ of the conventional method, and an accuracy becomes four times as much as the conventional method.

(Merit 2)

According to the present invention, in order to prevent deposition of impurities or ion from the sensor to a medium subject to measurement and to improve the corrosion resistance of the sensor, even in the case where the reflector is made of a synthetic resin, the reflection time of an ultrasonic wave is restricted to one time (reflection time when detecting $t_2$ and $t_4$) at the maximum in the whole transmission and reception process when measuring, and thereby, it is possible to measure with high accuracy and stability a velocity of sound in the following manner as compared with the conventional method.

More specifically, in the case where the reflector is made of a synthetic resin or the like, a reflectivity ($R_o$) of an ultrasonic wave is obtained from the following equation (11).

$$R_o = \frac{Z_1 - Z_2}{Z_1 + Z_2} \quad (11)$$
$$\approx 1.3/4.3$$
$$\approx 1/3.3$$

Where,
$Z_1$: acoustic impedance of water
$Z_2$: acoustic impedance of synthetic resin (PFA)

In this case, according to the present invention, the reflection of an ultrasonic wave when detecting $t_1$ and $t_3$ is zero (0), and the reflection of an ultrasonic wave when detecting $t_2$ and $t_4$ is one time, and therefore, the reflection of an ultrasonic wave is one time at the maximum in the whole transmission reception process. As a result, a reflectivity Rn is obtained from the following equation (12).

$$Rn = R_o^1 = 1/3.3 \quad (12)$$

On the contrary, according to the conventional overlap method, the reflection of an ultrasonic wave when detecting $t_{01}$ of FIG. 5 is one time, and the reflection of an ultrasonic wave when detecting $t_{02}$ is three times, and therefore, the reflection of an ultrasonic wave is three times at the maximum in the whole transmission reception process. As a result, a reflectivity Ru is obtained from the following equation (13).

$$Ru = R_o^3 = 1/36 \quad (13)$$

According to the present invention, the total reflectively in the whole transmission and reception process becomes ten times or more as much as the conventional method, and it is possible to obtain a ten-fold or more increase in signal energy of a received wave, and to stably make a measurement.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DETAILED DESCRIPTION OF THE PREFERRED EMBODIMENTS

Figure 1:
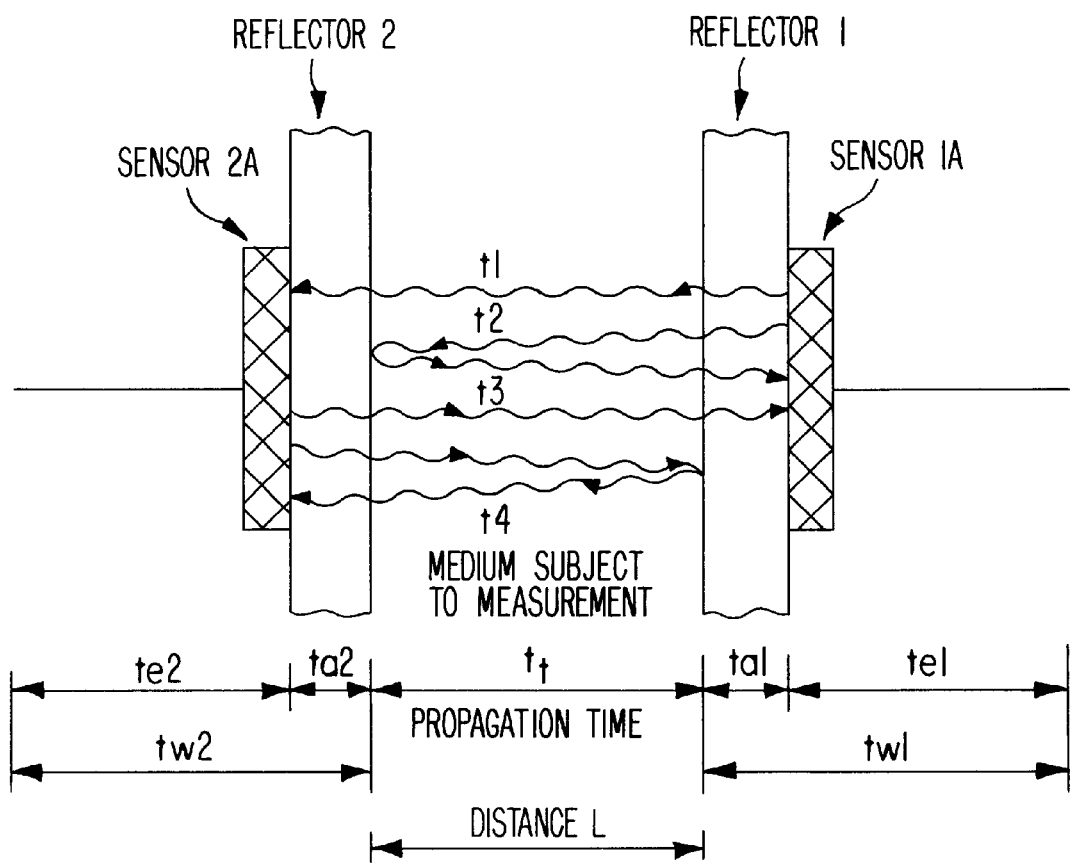
FIG. 1 is a schematic view showing a facing-arrangement type ultrasonic sensor of the present invention.
Figure 2:
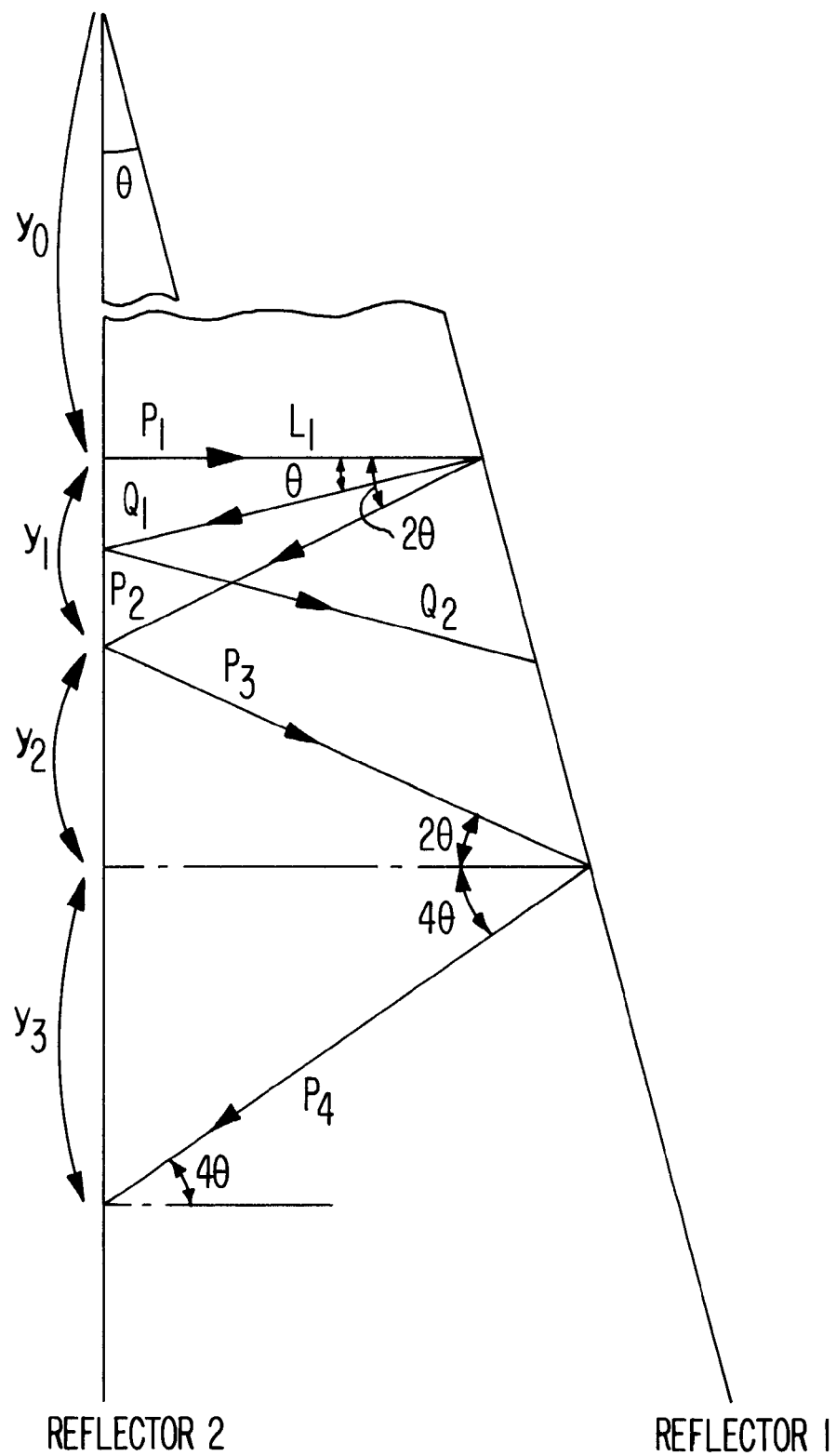
FIG. 2 is a schematic view to explain the principle of a measuring (measurement) error in a method according to the present invention and a conventional method.
Figure 3:
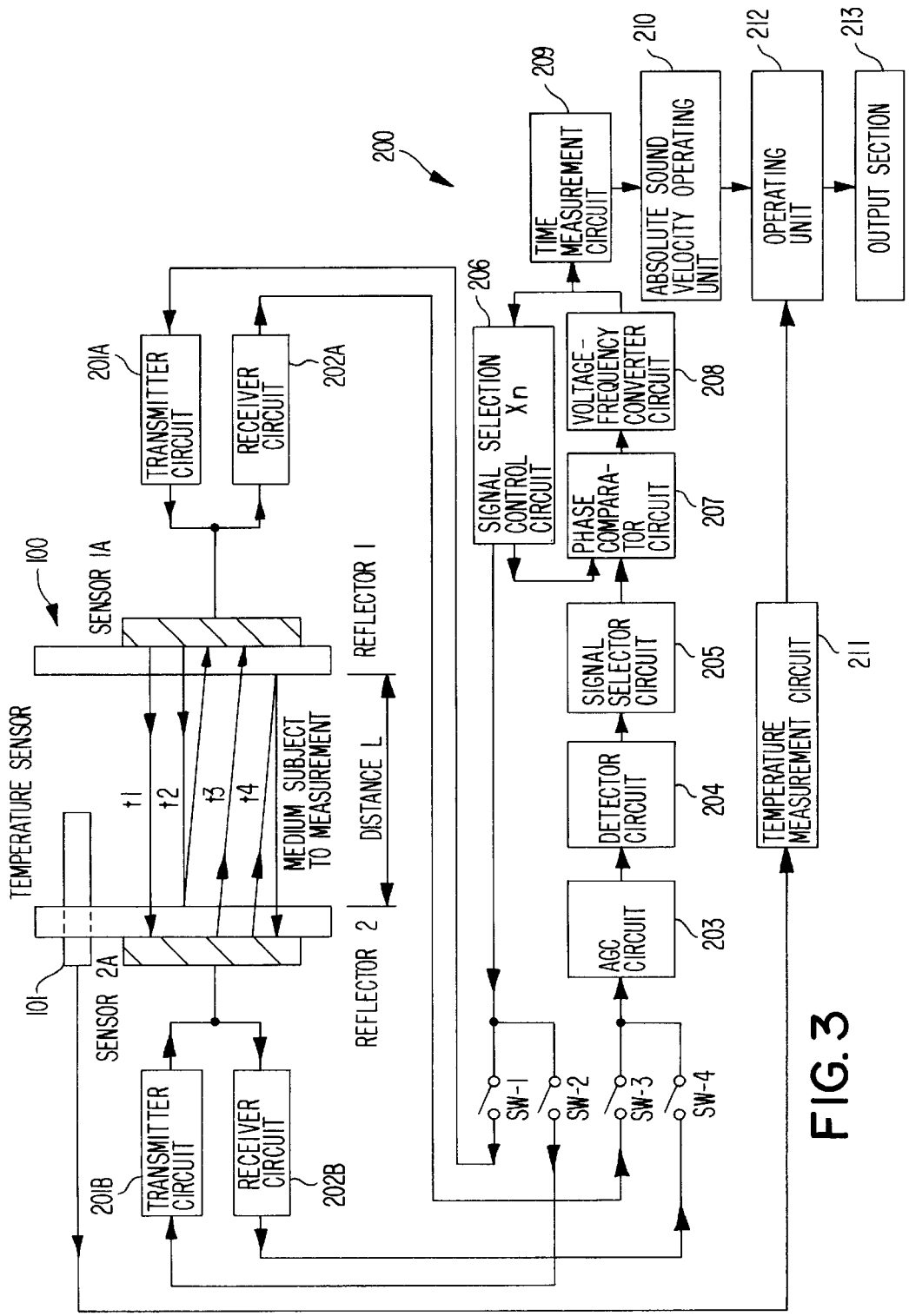
FIG. 3 is a block diagram showing a circuit configuration of an apparatus for ultrasonic wave measurement.
Figure 4:
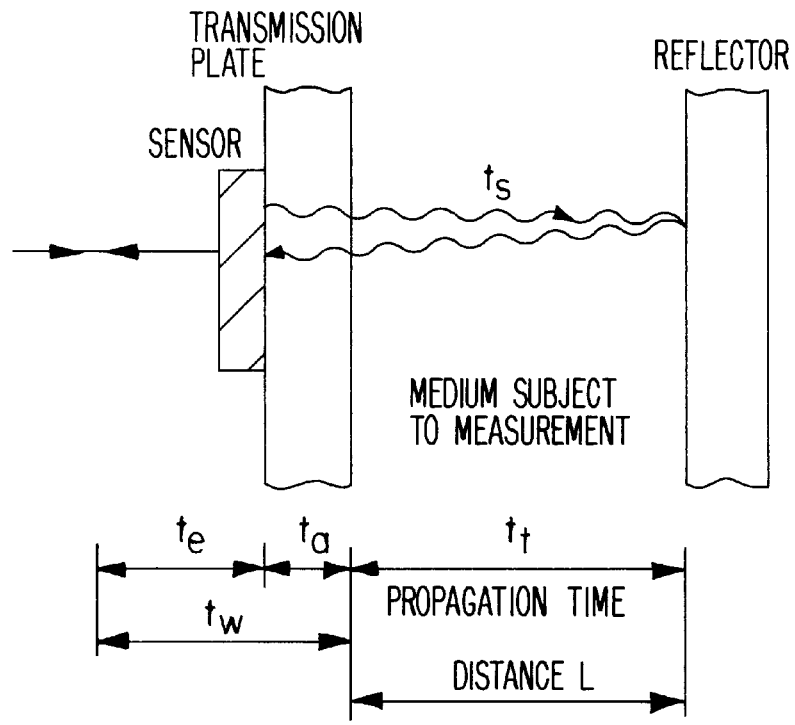
FIG. 4 is a schematic view illustrating a conventional sing around method.
Figure 5:
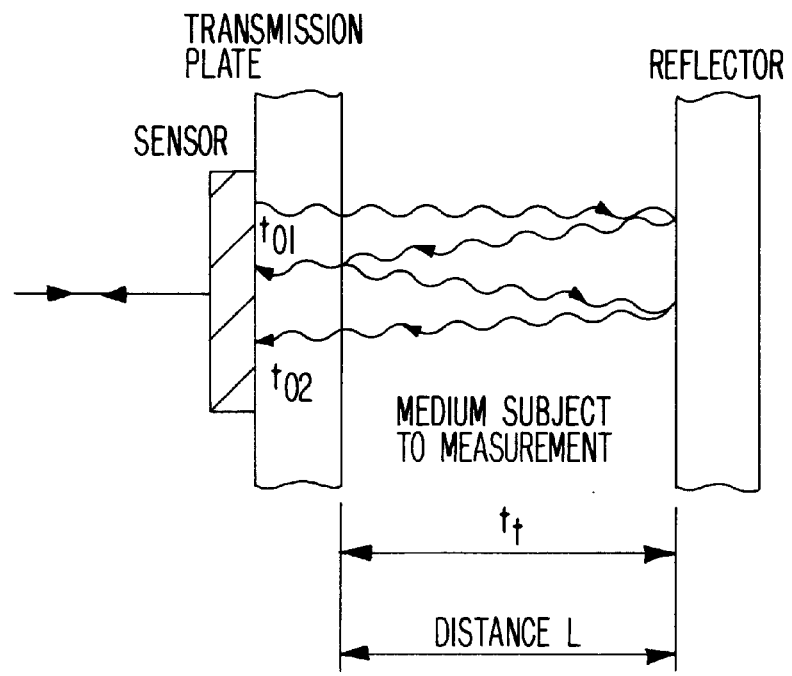
FIG. 5 is a schematic view illustrating a conventional overlap method.

FIG. 3 is a block diagram showing a circuit configuration of an apparatus for ultrasonic wave measurement.

An apparatus for ultrasonic wave measurement is composed of an ultrasonic wave transmitter/receiver device 100 and a measurement circuit 200.

The ultrasonic wave transmitter/receiver device 100 is constructed in a manner that a reflector 1 including a sensor 1A and a reflector 2 including a sensor 2A are arranged facing each other with a distance L, and a medium subject to measurement (a gas, a liquid or a solid) is interposed between these reflectors 1 and 2. Further, the ultrasonic wave transmitter/receiver device 100 includes a temperature sensor 101.

The measurement circuit 200 is composed of first and second transmitter circuits 201A and 201B, first and second receiver circuits 202A and 202B, switches 1 to 4 (SW-1 to SW-4), an AGC circuit 203, a detector circuit 204, a signal selector circuit 205, a signal selection control circuit 206, a phase comparator circuit 207, a voltage-frequency converter circuit 208, a time measurement circuit 209, an absolute sound velocity operating unit 210, a temperature measurement circuit 211, an operating unit 212 and an output section 213.

The measurement circuit 200 measures times $t_1$ to $t_4$ of the present invention with the use of the time measurement circuit 209 according to the following descriptions (a) to (d).

(a) Time $t_1$:

The measurement circuit 200 closes the SW-1 and the SW-4, and then, measures a propagation time ($t_1$) until an ultrasonic wave is transmitted from the sensor 1A, and is received in the sensor 2A.

At that time, the measurement circuit 200 determines the propagation time $t_1$ in the following manner (determines $t_2$ to $t_4$ in the same manner as $t_1$).

An ultrasonic wave is transmitted from the sensor 1A, and then, is received in the sensor 2A and the reception circuit 202B. The ultrasonic wave is detected by means of the detector circuit 204 via the SW-4 and the AGC circuit 203, and then, a signal is selected by means of the signal selector circuit 205.

The phase comparator circuit 207, the voltage-frequency converter circuit 208 and the signal selection control circuit 206 constitutes a PLL, and converts the signal into a frequency ($f_1$) having one period which is n times as much as the time ($t_1$) from transmission to reception. For each period, an ultrasonic wave is transmitted from the sensor 1A via the SW-1 and the transmitter circuit 201A from the signal selection control circuit 206. Moreover, an integer "n" is set so as to obtain a time to avoid an influence of multiple wave to measurement.

The frequency ($f_1$) is measured by means of the time measurement circuit 209, and then, the propagation time ($t_1$) determines from the frequency.

(b) Time $t_2$:

The measurement circuit 200 closes the SW-1 and the SW-3, and then, measures a propagation time ($t_2$) until an ultrasonic wave transmitted from the sensor 1A is reflected by the reflector 2, and thereafter, is received in the sensor 1A.

(c) Time $t_3$:

The measurement circuit 200 closes the SW-2 and the SW-3, and then, measures a propagation time ($t_3$) until an ultrasonic wave is transmitted from the sensor 2A, and is received in the sensor 1A.

(d) Time $t_4$:

The measurement circuit 200 closes the SW-2 and the SW-4, and then, measures a propagation time ($t_4$) until an ultrasonic wave transmitted from the sensor 2A is reflected by the reflector 1, and thereafter, is received in the sensor 2A.

Next, the measurement circuit 200 makes an operation of times ($t_1$, $t_2$, $t_3$, $t_4$) determined in the above items (a) to (d) by the above equation (3) with the use of the absolute sound velocity operating unit 210, and thus, determines a propagation time $t_r$ of ultrasonic wave in the distance L between the reflectors 1 and 2.

Then, the measurement circuit 200 analyzes the propagation time $t_r$ determined by the absolute sound velocity operating unit 210 by the above equation (4) with the use of the operating unit 212, and thus, determines an absolute sound velocity (V). Further, the measurement circuit 200 measures a temperature T of the medium subject to measurement by means of the temperature sensor 101 and the temperature measurement circuit 211, and can obtain information such as moisture, concentration of the medium subject to measurement on the basis of the temperature T and the absolute sound velocity V and thus, is outputted from the output section 213.

As described above, according to the present invention, it is possible to measure with high accuracy and stability the propagation time of an ultrasonic wave according to the method which is resistant to the influence of external factors.

While the preferred embodiments of the invention have been described in detail with reference to the drawings, they are by no means exhaustive, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A method for ultrasonic wave measurement, in which first and second ultrasonic sensors are arranged to face each other, and these first and second ultrasonic sensors are respectively provided with first and second reflectors on their surfaces, and further, an interval between these reflectors is set as a distance L, comprising the steps of:

measuring a time $t_1$ until an ultrasonic wave transmitted from the first ultrasonic sensor is received in the second ultrasonic sensor, a time $t_2$ until the ultrasonic wave transmitted from the first ultrasonic sensor is reflected by the second reflector, and is received by the first ultrasonic sensor, a time $t_3$ until the ultrasonic wave transmitted from the second ultrasonic sensor is received in the first ultrasonic sensor, and a time $t_4$ until the ultrasonic wave transmitted from the second ultrasonic sensor is reflected by the first reflector, and is received in the second ultrasonic sensor, within a medium subject to measurement; and determining a propagation time $t_r$ of an ultrasonic wave in the distance L within the medium subject to measurement from the following equation $t_r=(t_4-t_3+t_2-t_1)/2$ and an absolute sound velocity V of the medium subject to measurement from the following equation $V=L/t_r$.

2. An apparatus for ultrasonic wave measurement, which is constructed in a manner that first and second ultrasonic sensors are arranged to face each other, and these first and second ultrasonic sensors are respectively provided with first and second reflectors on their surface, an interval between these reflectors is set as a distance L, comprising:

a time measurement circuit for measuring a time $t_1$ until an ultrasonic wave transmitted from the first ultrasonic sensor is received in the second ultrasonic sensor, a time $t_2$ until the ultrasonic wave transmitted from the first ultrasonic sensor is reflected by the second reflector, and is received by the first ultrasonic sensor, a time $t_3$ until the ultrasonic wave transmitted from the second ultrasonic sensor is received in the first ultrasonic sensor, and a time $t_4$ until the ultrasonic wave transmitted from the second ultrasonic sensor is reflected by the first reflector, and is received in the second ultrasonic sensor, within a medium subject to measurement; and an operating circuit for determining a propagation time $t_r$ of an ultrasonic wave in the distance L within the medium subject to measurement from the following equation $t_r=(t_4-t_3+t_2-t_1)/2$ and an absolute sound velocity V of the medium subject to measurement from the following equation $V=L/t_r$.

\* \* \* \* \*